United States Patent [19]

Hübner et al.

[11] 3,960,394

[45] June 1, 1976

[54] PIPE UNION

[75] Inventors: Wolfgang Hübner, Leipzig; Wilhelm Fasshauer, Halle, both of Germany

[73] Assignee: Deutsches Brennstoffinstitut Freiberg, Freiberg, Germany

[22] Filed: Aug. 16, 1973

[21] Appl. No.: 388,977

[52] U.S. Cl. ............................................. 285/297
[51] Int. Cl.² .......................................... F16L 13/00
[58] Field of Search ........... 285/297, 294, 287, 351, 285/292

[56] References Cited
UNITED STATES PATENTS

| | | | |
|---|---|---|---|
| 627,673 | 6/1899 | McDonald | 285/297 |
| 1,102,961 | 7/1914 | Schomburg | 285/297 X |
| 1,770,852 | 7/1930 | Hill | 285/297 X |
| 2,156,604 | 5/1939 | Payne et al. | 285/297 X |
| 2,492,823 | 12/1949 | Young | 285/297 |
| 2,903,763 | 9/1959 | Grenell | 285/294 X |
| 3,112,564 | 12/1963 | Murray | 285/294 X |
| 3,606,401 | 9/1971 | Schwarz | 285/294 |

*Primary Examiner*—H. Hampton Hunter
*Attorney, Agent, or Firm*—Michael J. Striker

[57] ABSTRACT

A pair of pipes have respective end portions one of which is received within the other and defines therewith an annular clearance. Two axially spaced sealing elements are sealingly accommodated in the clearance, and an opening in the outer one of the end portions communicates with the clearance intermediate these sealing elements. A body of hardened material, which was admitted in flowable state via the passage, is accommodated in and fills the clearance intermediate the sealing elements to thereby unite the pipes in stress-transmitting contact with the end portions.

13 Claims, 4 Drawing Figures

PIPE UNION

BACKGROUND OF THE INVENTION

The present invention relates generally to a pipe union and more particularly to a pipe union which is suitable for both metallic and non-metallic pipes, especially but not exclusively for those of large diameter and subject to high interior pressures.

It is known from the prior art to provide non-metallic pipes, that is pipes of synthetic plastic material and the like, which are connected at their juncture by adhesive connections, by welding or by simple friction couplings using elastic sealing members. The friction couplings, wherein the end portion of one pipe is pushed into that of a pipe with which it is to be connected, is particularly advantageous in terms of the simplicity of establishing such a pipe connection. This is especially helpful where the pipe union must be established in situ, that is on a construction site.

However, the prior-art constructions for friction couplings have certain disadvantages. In order for the elastic sealing element which is accommodated between the connected end portions of the pipes in such couplings, to be fully effective even in the event of high interior pressures in the pipes, it is necessary that the clearance between the two telescoped-together pipe end portions must be of small dimensions. If that is not the case, the elastic sealing element can be pushed out of its proper position by the interior pressure existing in the pipes, and the sealing effectiveness can thereby become lost. Because of the small dimensions permissible for the clearance, the connected pipes can perform only a small relative angular movement, but in many instances the installation conditions are such that angular movements of a more significant extent are required. Moreover, in these prior-art constructions any relative angular movement of the pipes results in stress-transmission between the pipes which can lead to destruction of the pipe material, because the free edge of the inner pipe end portion is wedged against a part of the inner circumferential surface of the outer pipe end portion, so that high pressures are transmitted over a small surface area, amounting, in effect, to transmission by point contact. For this latter reason, in particular, it has heretofore been necessary to install pipes which are connected in this manner, with exceedingly great care. If, as is frequently the case, the pipes are to be located at the bottom of a pipe ditch, then it was necessary to place the pipes onto the bottom of the ditch and to connect them only after they had been put in place. This, on the other hand, necessitated that the ditch had to be much wider than would otherwise have been the case, in order to permit access of the operators to the pipes. Needles to say, the wider the ditch must be made, the more work is involved in digging it and the more expensive the installation will become.

A further disadvantage of these prior-art telescoped pipe connections has been that they do not provide for retention of the pipes against axial separation. This could be overcome, for instance in cases where the pipes are installed in a ditch, by providing a requisite number of abutments which engage the pipes and prevent their axial displacement. However, a large number of such abutments would have to be provided, and the larger the pipe diameter and the interior pressure to which the pipes are subjected, the stronger would be the forces tending to separate the pipes axially and the larger would have to be the abutments.

An attempt has been made in the prior art to avoid this last problem by using a telescoped-together pipe connection which is provided with passages in the connected end portions, which passages so cooperate with one another that when, after the telescoping-together of the pipe end portions, a length of steel rope or wire rope is inserted into these passages, the two pipes will be locked against relative axial displacement. This, also, has certain disadvantages. On the one hand, if the pipes are of synthetic plastic material which does not corrode, the use of the wire rope which does readily corrode introduces a factor which can significantly reduce the maintenance-free lifetime of a pipe installation. Moreover, if the pipes are of large diameter and/or subjected to high internal pressures, the use of this type of connection is in any case of questionable validity, both in terms of the economics involved and in terms of the structural strength. In addition, if pipes connected in this manner undergo relative angular movement, which in actual practices can hardly ever be excluded, the forces which are transmitted between the pipes via the wire rope act upon very small surface areas of the respective pipes, so that there is again the danger that the pipe material might become damaged or even destroyed.

Another type of pipe union known from the prior art provides for a snap-coupling of the pipe end portions to be connected, wherein one pipe end portion is forced into the other pipe end portion of the adjacent pipe, which is possible because the synthetic plastic material of which these pipes are made is capable of yielding sufficiently to permit such introduction. An adhesive or a sealing material is then injected into spaces which are provided between the outer circumferential surface of the inner pipe end portion and the inner circumferential surface of the outer pipe end portion.

It is evident that this type of pipe union also is possessed of certain disadvantages. In the first place, it can be practiced only with pipes of synthetic plastic material, and with pipes of relatively thin walled construction and of small dimensions, because this type of connection relies on the resilient deformation of the pipe material. Furthermore, angular displacement of the connected pipes with reference to one another is neither possible nor permissible because such displacements would break the seal between the two connected pipe end portions. Moreover, such a coupling can be successfully used only if the pipe end portions to be connected are dimensionally very accurate, which in many instances is a very difficult or even impossible requirement. It is clear that tolerance variations under such circumstances will readily lead to leakage at the pipe union. Aside from all this, it will be appreciated that the use of adhesives for injection in the manner outlined above, is not readily practical for in situ installations, because even relatively minor ambient influences, for instance dust, moisture, strong sunlight or the like, can so influence the quality of the adhesive connection as to jeopardize the integrity and sealing effectiveness of the pipe union. Despite these disadvantages, the use of adhesive connections for joining small-diameter pipes has become relatively widespread, but adhesive connections for large-diameter pipes have never been used in practice.

As has been pointed out earlier, it is also known in the prior art to weld end portions of respective pipes together. Of course, this would in almost all instances have to be done in situ, that is at the building site, and this requires the presence of skilled personnel and of relatively complicated and expensive equipment. Aside from that, a connection by welding is limited to only certain types of pipe materials and is relatively slow and therefore economically not attractive.

In addition to the various disadvantages outlined above with respect to the prior art, all of the prior-art pipe unions have the further drawback that if they develop a leak, the location of the lead along a line of pipes can be established only with great difficulty, and by time-consuming procedures. It is not only necessary that each pipe union be completely accessible at all points of its circumference, but also the specific manner in which the tests for tightness must be carried is relatively primative and involves the use of bubble-blowing material or the like.

SUMMARY OF THE INVENTION

It is, accordingly, a general object of the present invention to overcome the disadvantages of the prior art.

More particularly, it is an object of the present invention to provide an improved pipe union which is not possessed of the aforementioned disadvantages.

Still more particularly, the invention aims to provide an improved pipe union which is especially suitable for large-diameter pipes which are subject to high interior pressures, and which can be used with very good results on pipes which are to be buried in the ground.

Another object of the invention is to provide such a pipe union which permits, insofar as the installation of pipes to be buried in the ground is concerned, the use of only narrow pipe ditches, thereby eliminating the need for and the time and labor associated with the digging of wide pipe ditches.

In keeping with these objects, and with others which will become apparent hereafter, including that the desired and novel pipe union be capable of permitting relatively significant angular inclination of connected pipes with reference to one another, the novel invention provides a pipe union which, briefly stated, comprises a pair of pipes having respective end portions one of which is received within the other and defines therewith an annular clearance. A pair of sealing elements is sealingly accommodated in the clearance and they are spaced from one another in axial direction of the clearance. Passage means communicates with the clearance intermediate the sealing elements, and a body of hardened material — which was admitted in flowable state via the passage means — is accommodated in and fills the clearance intermediate the sealing elements, to thereby unite the pipes in stress-transmitting contact with the end portions thereof.

Such a pipe union can be used with pipes which must be prevented from performing relative axial movements, as well as those where relative axial movements are of no consequence. Moreover, it meets the aforementioned objects and in addition makes it possible to readily test the tightness or leakiness of any particular pipe union in a similar and more sophisticated manner that was possible with the prior art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
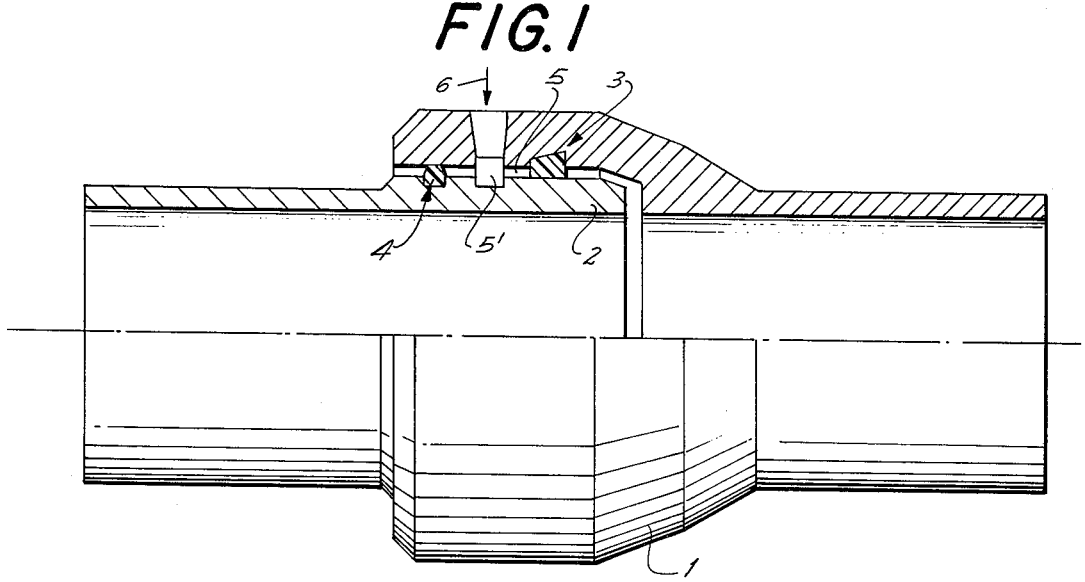
FIG. 1 is a fragmentary, partially sectioned view illustrating one embodiment of the invention, prior to the introduction of the body of hardenable material.
Figure 2:
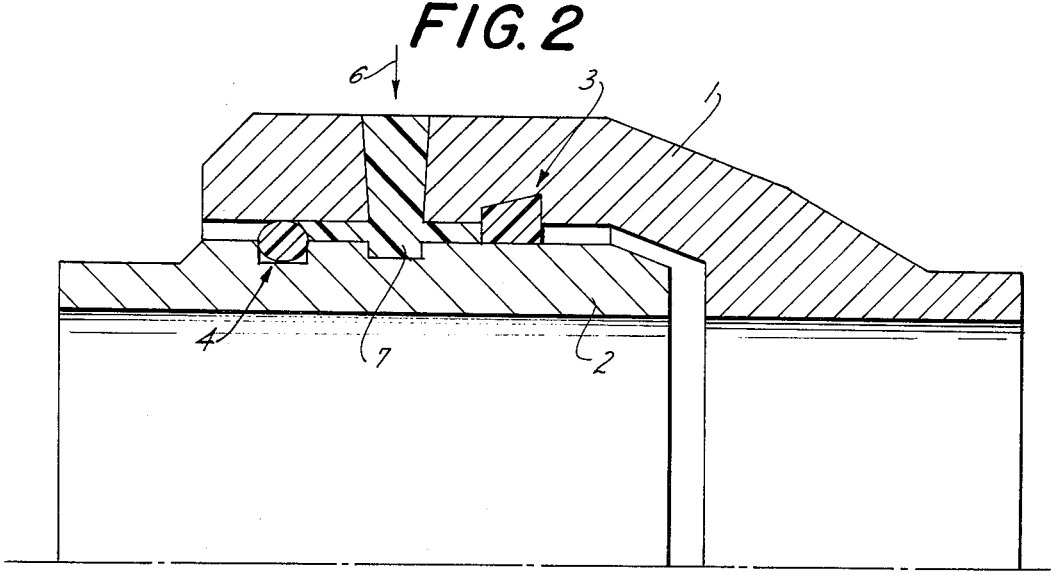
FIG. 2 is a sectioned enlarged detailed view of FIG. 1 showing the body of hardenable material in place.

Discussing the drawing now in detail, and referring firstly to the embodiment in FIGS. 1 and 2, it will be seen that two fragmentarily shown pipes are provided, of which one has an end portion 2 which is received within the enlarged bell-shaped end portion 1 of the other pipe. After the end portions 1 and 2 are thus telescoped together, in the manner shown in FIG. 1, they define with one another a relatively large annular clearance 5. Located in this clearance 5 are two sealing rings 3 and 4 of which the former performs the main sealing function and the latter an auxiliary sealing function. The sealing rings 3 and 4 may be of any well known sealing material which is conventionally used in pipe unions. Because the sealing rings 3 and 4 are axially spaced from one another, they seal a portion of the clearance 5 between themselves, that is the portion intermediate the sealing rings 3 and 4 is sealed both against access from the interior of the pipes and from the exterior of the pipes. The volume of this portion may be enlarged, if desired, by providing the inner circumferential surface of the end portion 1 and/or the outer circumferential surface of the end portion 2 with one or more recesses 5' (one shown in each of these surfaces) which communicate with and constitute a part of the clearance 5. Reference numeral 6 identifies a passage communicating with the clearance 5, here in the region of the recesses 5', and through which a hardenable material state can be introduced to fill the clearance 5 and the recesses 5'.

When the pipes with the novel pipe union are installed, it is advantageous if the passages 6 are so oriented as to face upwardly, to prevent the flowable material from flowing out again before it can harden. Before the material is introduced, to form the body 7 after it has hardened, the interior of the pipes is subjected to a slight overpressure, as compared to atmospheric pressure, so that the sealing effectiveness of the seals 3 and 4 can be tested. For this purpose, it is only necessary to connect the passage 6 with a pressure measuring device and to observe whether a leak exists which would be detected due to the escape of material from the interior of the pipes through the clearance 6, past the body 7 and out of the passage 6. Thereupon, the hardenable material is introduced and, when it is hardened and formed the body 7, the pipes connected by the pipe union can be operated at full internal pressure.

If the hardenable material forming the body 7 if of the type having adhesive capabilities, then the recesses 5' can be omitted, since their purpose is primarily to facilitate a blocking of the end portions 1 and 2 against relative axial movement, due to the pressure of hardenable material therein.

It will be appreciated that when the body 7 has come into being, that is when the material has hardened to form the body 7, axial forces are uniformly transmitted between the end portions 1 and 2 over the entire circumference thereof. The pipe can resist axial and tangential stresses due to the interior pressure and acting within the pipe wall. Localized transmission of forces, for instance by point contact as mentioned with respect to the prior art, is completely avoided and the resultant excess stressing of the material is thus prevented.

Figure 3:
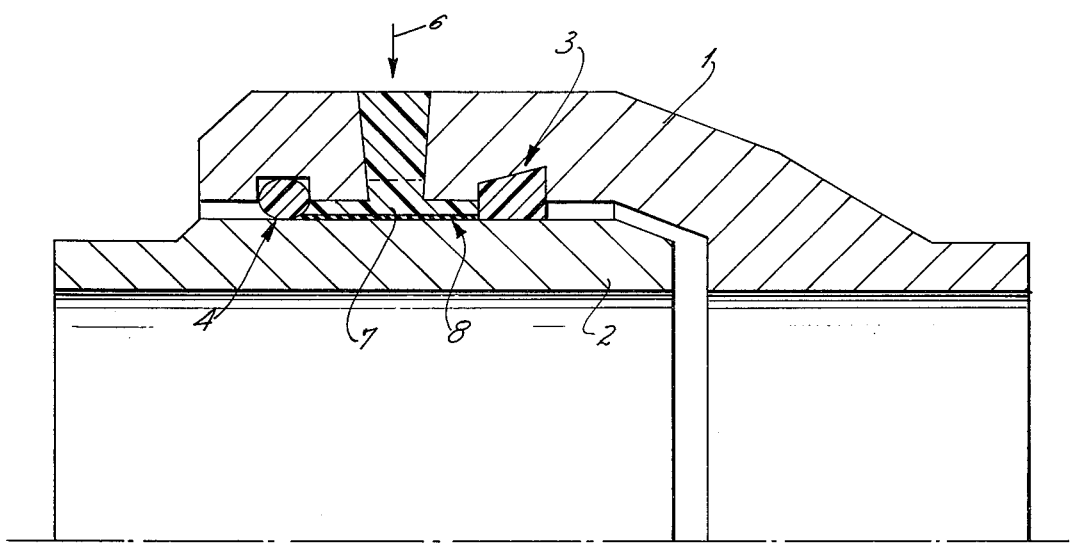
FIG. 3 is a view similar to FIG. 2, illustrating a further embodiment of the invention.
Figure 4:
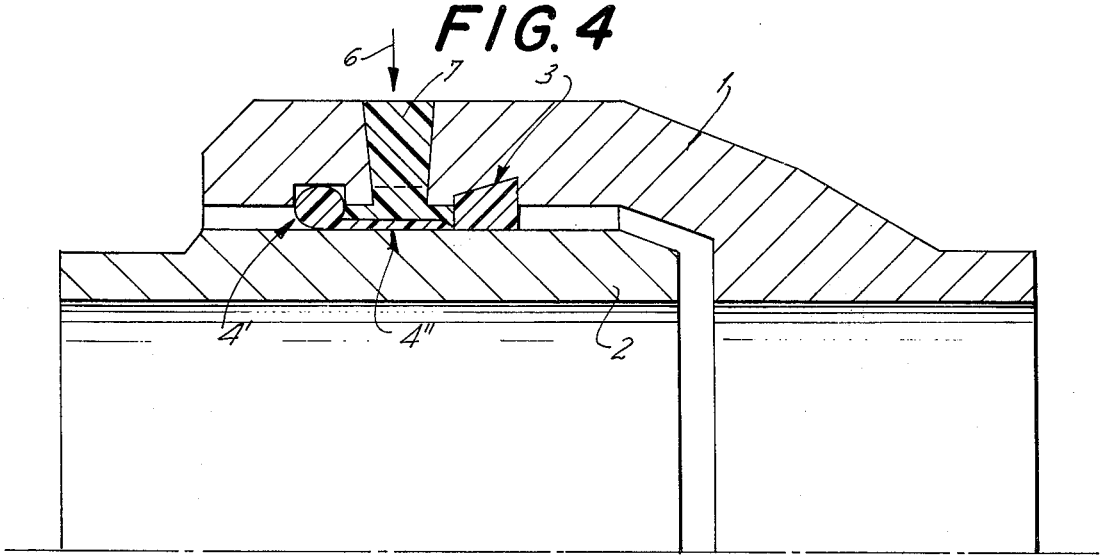
FIG. 4 is a view similar to FIG. 3, but illustrating still an additional embodiment of the invention.

FIGS. 3 and 4 show two embodiments of the invention which are particularly suitable for pipes which must not be subjected to axial forces. The pipe can only resist tangential stresses due to the interior pressure. The connection also must not prevent relative axial movement, as is the case in FIGS. 1 and 2. This type of pipe is substantially less expensive to produce then the type of pipe used in FIGS. 1 and 2, and it can be readily used if the pipeline is to be straight.

In the embodiment of FIG. 3, wherein like reference numerals identify the same components as in FIGS. 1 and 2, the arrangement is essentially the same as in FIGS. 1 and 2 except that a separating layer 8 is provided which prevents stress-transmitting bonding of the body 7 to the end portion 2. It will be seen that the layer 8 is interposed between the body 7 and the outer circumferential surface of the end portion 2. The layer 8 is provided to assure that although the clearance 5 is entirely filled, freedom of slight relative axial movement between the pipes having the end portions 1 and 2 remains, while the sealing ring 3 is nevertheless reliably supported against displacement out of its position under the influence of interior pressure, just as in the case of FIGS. 1 and 2.

In the embodiment of FIG. 4, like reference numerals again identify the same components as in FIGS. 1 and 2. Here, however, the sealing ring 4 is replaced with a sealing ring 4'having an annular or a tubular lip or projection 4'' which surrounds the outer circumferential surface of the end portion 2 and extends all the way to the sealing ring 3. This particular arrangement has the advantage that even after the body 7 has been formed and the pipe union is in operative condition, a certain amount of freedom of relative angular displacement of the pipes having the end portions 1 and 2, is maintained—due to the elastic compressibility of the material of the lip 4''—without having to fear that the pipe union will be destroyed as a result of such movement. This means that even if the ground in which the pipeline is embedded should settle or otherwise move, no damage to the seal-tightness of the pipe union will develop despite the fact that the pipes having the end portions 1 and 2 can move relative to one another to a certain extent.

Resort to the present invention permits, in effect, a mechanized installation of a pipeline, that is all of the various steps needed for establishing the respective pipe union can be carried out by means of mechanical devices. This results in high productivity and reduction in the expenses of installation.

The material for the body 7 is advantageously a synthetic plastic resin material, for instance, Mokodur L5001 and hardening agent H11 (GDR trade name), which preferably has filler material, such as chopped glass fibers, embedded in it for strength. Such resin material provides the necessary strength, especially if reinforced, and is capable of transmitting high pressures and shear forces. On the other hand, these resins do not during setting shrink to such an extent that the clearance would not be properly filled when the body 7 is in existence.

The material of the layer 8 or of the lip 4''should advantageously be elastically yieldable, in order to permit the aforementioned relative angular displacement of the pipes having the end portions 1 and 2.

Due to the fact that the sealing ring 3 is always reliably supported by the material of the body 7, it cannot be pushed out of its assigned position. This, on the other hand, makes it possible to provide a relatively large clearance 5 which, in turn, makes it possible in the first place to provide the body 7. Also, due to the large clearance it is possible, if and where necessary, to angle the pipes having the end portions 1 and 2 with reference to one another to quite a significant extent, before the material is introduced which subsequently hardens and forms the body 7.

All in all, the present invention makes it possible to install a pipeline in a relatively narrow pipe ditch, which need not be any wider than if steel pipes are installed. It is merely necessary to raise the last-installed pipe with an appropriate mechanical device out of the ditch, so that the next pipe can be connected to it by means of the novel pipe union. The pipes are subsequentally allowed to descend into the ditch to rest on the bottom thereof or be otherwise supported. This manner of installation can be utilized even if water should run into the ditch, as long as the water does not cause the pipeline to float in the ditch. The fact that the auxiliary sealing ring 4 is present in all instances, assures that water cannot enter into the clearance 5 so that the latter will always remain clean and dry in readiness for the introduction of the material which hardens and turns into the body 7.

When the pipe unions have been completed, that is when the material introduced through the passage 6 has hardened and formed the respective bodies 7, the pipeline can be pressurized at full operating pressure to check the tightness of the line.

It will be understood that each of the elements described above, or two or more together, may also find a useful application in other types of constructions differing from the type described above.

While the invention has been illustrated and described as embodied in a pipe union, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended without the meaning and range of equivalence of the following claims.

What is claimed as new and desired to be protected by Letters Patent is set forth in the appended claims:

1. A rigid pipe union, particularly for large-diameter pipes which are subject to high interior pressures, comprising a pair of pipes having respective male and female end portions, the male end portion being of a substantially smaller outer diameter than the inner diameter of said female portion and being received within said female portion and defining therewith a relatively large annular clearance; a pair of sealing elements sealingly accommodated in said clearance and being spaced from one another in axial direction of said clearance; passage means communicating with said clearance intermediate said sealing elements; and a rigid body of hardened material admitted in flowable state via said passage means, accommodated in and filling said clearance intermediate said sealing elements and thereby rigidly uniting said pipes in stress-transmitting contact with said end portions thereof.

2. A pipe union as defined in claim 1, wherein said pipes are of synthetic plastic material.

3. A pipe union as defined in claim 1, said end portions having respective juxtaposed circumferential surfaces which define with one another said clearance; and wherein at least one of said surfaces is provided with a recess in the region where said passage means communicates with said clearance, said recess being opened to and constituting an enlargement of said clearance, and said body also filling said recess.

4. A pipe union as defined in claim 1, said end portins having respective juxtaposed circumferential surfaces which define with one another said clearance; and further comprising separating means interposed between said body and one of said surfaces and preventing adherence of the former to the latter.

5. A pipe union as defined in claim 4, wherein said one surface is the circumferential surface of said one end portion.

6. A pipe union as defined in claim 4, wherein said separating means comprises a portion of elastically yieldable material.

7. A pipe union as defined in claim 6, wherein said portion is of one piece with one of said sealing elements, said portion being of tubular configuration and extending from said one to the other of said sealing elements.

8. A pipe union as defined in claim 1, wherein said body is of synthetic resin material.

9. A pipe union as defined in claim 1, wherein said body is of glass-fiber reinforced synthetic resin material.

10. A pipe union as defined in claim 1, wherein said passage means is provided in said other end portion and has an inlet end which is accessible exteriorly of said pipes.

11. A pipe union as defined in claim 3, wherein at least one of said end portions is provided with a circumferential groove in which one of said sealing elements is partly accommodated.

12. A pipe union as defined in claim 11, wherein the other of said end portions is also provided with a circumferential groove in which the other of said sealing elements is partly accommodated.

13. A pipe union as defined in claim 11, wherein said one end portion is provided with another axially spaced circumferential groove in which the other of said sealing elements is partly accommodated.

* * * * *